US009880951B2

(12) United States Patent
Ono

(10) Patent No.: US 9,880,951 B2
(45) Date of Patent: Jan. 30, 2018

(54) CIRCUIT FOR USING SHARED MEMORY, AND METHOD OF STORING DETERMINATION RESULT OF ARBITRATION CONTENT OF ARBITRATOR OF THIS CIRCUIT

(71) Applicants: KABUSHIKI KAISHA TOSHIBA, Tokyo (JP); TOSHIBA TEC KABUSHIKI KAISHA, Tokyo (JP)

(72) Inventor: Shinji Ono, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 341 days.

(21) Appl. No.: 14/462,086

(22) Filed: Aug. 18, 2014

(65) Prior Publication Data

US 2015/0074308 A1  Mar. 12, 2015

(30) Foreign Application Priority Data

Sep. 6, 2013 (JP) .................................. 2013-185558

(51) Int. Cl.

| G06F 13/36 | (2006.01) |
| G06F 13/362 | (2006.01) |
| G06F 13/00 | (2006.01) |
| H04J 3/00 | (2006.01) |
| H04W 4/00 | (2009.01) |

(Continued)

(52) U.S. Cl.
CPC ................................. G06F 13/1605 (2013.01)

(58) Field of Classification Search
CPC ........... G06F 17/30144; G06F 12/0868; G06F 13/1605; G06F 13/38

USPC .................. 710/110, 117; 370/336, 329, 294
See application file for complete search history.

(56) References Cited

U.S. PATENT DOCUMENTS 4,736,366 A * 4/1988 Rickard ................ G06F 13/374
370/439
5,848,266 A * 12/1998 Scheurich ......... H04L 12/40058
370/468

(Continued)

FOREIGN PATENT DOCUMENTS

| JP | H11-353286 A | 12/1999 |
| JP | 2006-318367 A | 11/2006 |

OTHER PUBLICATIONS

Japanese Office Action with English translation, Patent Application No. JP 2013-185558, dated Jun. 30, 2015, 11 pages.

*Primary Examiner* — Faisal M Zaman
(74) *Attorney, Agent, or Firm* — Patterson & Sheridan LLP

(57) ABSTRACT

According to an embodiment, a circuit for using a shared memory is provided, which has a plurality of function circuits, a bus, an arbitrator, and a communication measuring device. Each of a plurality of the function circuits performs a prescribed calculation. The bus communicates an input/output signal of each of the function circuits. The arbitrator assigns a use right of the bus to each of the function circuits. The communication measuring device measures a communication time of each of the function circuits, determines whether or not the measured communication time is within a range of a reference communication time set for each of the function circuits, and stores this determination result in a determination result storage device accessible from outside.

11 Claims, 7 Drawing Sheets

(51) Int. Cl.
*H04L 5/14* (2006.01)
*G06F 13/16* (2006.01)

(56) References Cited

U.S. PATENT DOCUMENTS

| | | | | |
|---|---|---|---|---|
| 6,430,640 B1* | 8/2002 | Lim | ........................ | G06F 13/18 710/200 |
| 6,621,806 B1* | 9/2003 | Keller | ................... | H04J 3/0685 370/329 |
| 6,771,626 B1* | 8/2004 | Golubiewski | ......... | H04J 3/1682 370/336 |
| 8,638,821 B2* | 1/2014 | Temple | ................. | H04L 12/407 370/321 |
| 2002/0073305 A1* | 6/2002 | Joseph | ................... | G06F 9/4401 713/1 |
| 2004/0184414 A1* | 9/2004 | Ohki | ........................ | H04L 47/11 370/260 |
| 2005/0114726 A1* | 5/2005 | Ouchi | ................. | G11B 20/1833 714/5.1 |
| 2006/0133278 A1* | 6/2006 | Hill | ......................... | H04L 47/10 370/235 |
| 2007/0233920 A1* | 10/2007 | Misawa | ................... | H04L 12/10 710/110 |
| 2008/0288731 A1* | 11/2008 | Izumi | ...................... | G06F 12/06 711/160 |
| 2010/0069112 A1* | 3/2010 | Sun | ..................... | H04W 74/085 455/553.1 |
| 2010/0250811 A1* | 9/2010 | Kawashita | .............. | G06F 13/24 710/260 |
| 2012/0155284 A1* | 6/2012 | Shaffer | .............. | H04W 72/0446 370/242 |
| 2013/0139018 A1* | 5/2013 | Takada | .................. | H04L 12/407 714/748 |
| 2015/0058658 A1* | 2/2015 | Izuta | ................. | G06F 11/0727 714/4.5 |
| 2015/0100723 A1* | 4/2015 | Brandl | ................ | G06F 13/1605 711/106 |

\* cited by examiner

CIRCUIT FOR USING SHARED MEMORY, AND METHOD OF STORING DETERMINATION RESULT OF ARBITRATION CONTENT OF ARBITRATOR OF THIS CIRCUIT

CROSS-REFERENCE TO RELATED APPLICATION

This application is based upon and claims the benefit of priority from the prior Japanese Patent Application No. 2013-185558, filed on Sep. 6, 2013, the entire contents of which are incorporated herein by reference.

FIELD

Embodiments described herein relate generally to a circuit for using a shared memory, having a function which can confirm whether or not the arbitration content of an arbitrator is proper.

BACKGROUND

A system including an ASIC (Application Specific Integrated Circuit), an FPGA (Field Programmable Gate Array), or a DRP (Dynamically Reconfigurable Processor), or the like has been put into practical use. This system has a plurality of circuits (hereinafter, called a function circuit) for realizing a single function under the control of a CPU (Central Processing Unit). This system has a shared memory, as a working memory of the CPU and a plurality of the function circuits. With the use of this system, cost and an occupation area of a memory in a board can be reduced.

In the above-described system, a plurality of the function circuits simultaneously transmit data signals to a bus connected to the shared memory. When a plurality of the function circuits simultaneously transmit the data signals to the bus, the above-described system becomes impossible to discriminate the signals from a plurality of the function circuits. When the system becomes impossible to discriminate the signals, the system becomes impossible to accurately perform the communication of information. In order to prevent the above-described matters, the system has an arbitrator provided between the shared memory and each of the function circuits. This arbitrator performs arbitration to assign a use right of the bus to each of the function circuits. Specifically, the arbitrator gives a prescribed data transfer time to each of the function circuits at a certain interval, according to a rule of a predetermined priority order and so on, to perform arbitration.

In the above-described arbitrator, setting of the priority order and so on of each of the function circuits is previously performed, in order to perform the arbitration. It is necessary that the setting of the arbitrator is performed in consideration of required specifications of each standard bus (a bus meeting a prescribed standard such as PCIe) and each of the function circuits. The required specification includes processing bands of the each standard bus and each of the function circuits, for example.

As described above, it is necessary that the setting of the arbitrator is properly performed so that the processing of each of the function circuits is within the required specification. However, in the above-described system, it is difficult that the setting of the arbitrator is properly performed because of the sharing of a memory and the conflict between the function circuits and so on. Furthermore, the above-described system does not have a scheme to confirm whether the set arbitration content of the arbitrator is proper.

DETAILED DESCRIPTION

Figure 1:
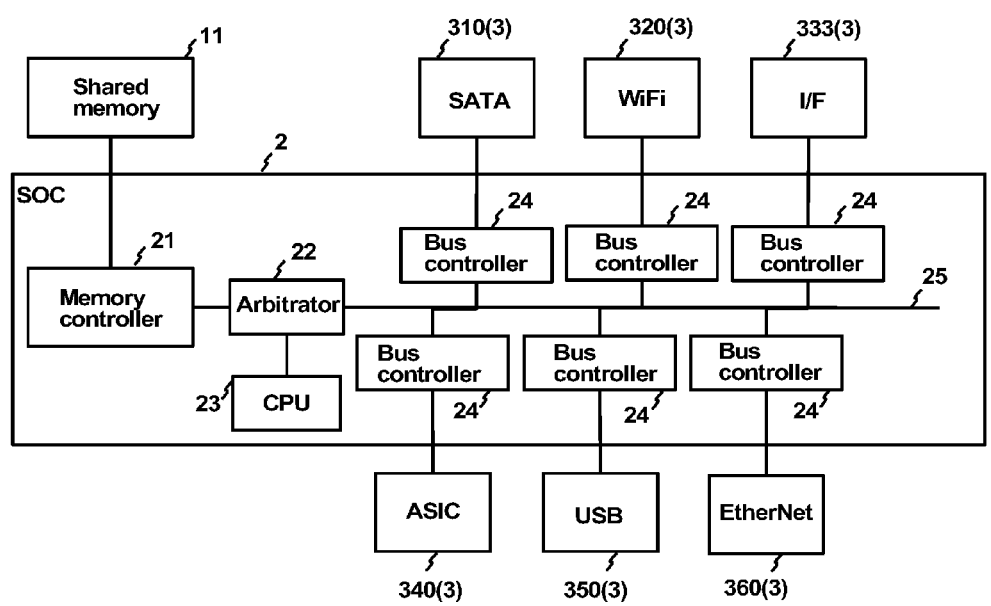
FIG. 1 is a block diagram showing a memory sharing system according to a first embodiment.

According to an embodiment, a circuit for using a shared memory is provided, which has a plurality of function circuits, a bus, an arbitrator, and a communication measuring device. Each of a plurality of the function circuits performs a prescribed calculation. The bus communicates an input/output signal of each of the function circuits. The arbitrator assigns a use right of the bus to each of the function circuits. The communication measuring device measures a communication time of each of the function circuits. The communication measuring device determines whether or not the measured communication time is within a range of a reference communication time set for each of the function circuits. The communication measuring device stores this determination result in a determination result storage device accessible from outside. In the following description, a circuit for using a shared memory may simply be called a shared memory using circuit.

According to another embodiment, in a shared memory using circuit having a plurality of function circuits, a bus, and an arbitrator, a method of storing determination result of arbitration content of the arbitrator is provided. Each of a plurality of the function circuits performs a prescribed calculation. The bus communicates an input/output signal of each of the function circuits. The arbitrator assigns a use right of the bus to each of the function circuits. The determination result storing method measures a communication time of each of the function circuits. The determination result storing method determines whether or not the measured communication time is within a range of a reference communication time set for each of the function circuits. The determination result storing method stores this determination result in a determination result storage device.

Hereinafter, further embodiments will be described with reference to the drawings. In the drawings, the same symbols show the same or similar portions.

A first embodiment will be described with reference to FIG. 1. FIG. 1 is a block diagram showing a memory sharing system 100 in which a shared memory using circuit according to the first embodiment is adopted.

As shown in FIG. 1, the memory sharing system 100 has a SOC (System-on-a-chip) 2. The memory sharing system 100 has a shared memory 11 and a plurality of input/output devices 3 which connect to the SOC 2. The external input/output devices 3 are a SATA (Serial ATA) 310, a WiFi (Wireless Fidelity) 320, an I/F (Interface) 330, an ASIC (Application Specific Integrated Circuit) 340, a USB (Universal Serial Bus) 35, and an EtherNet 36, for example.

The SOC 2 has a memory controller 21, an arbitrator 22, a CPU 23, a plurality of bus controllers 24, and an internal bus 25. A plurality of the bus controllers 24 connect to the respective external input/output devices 3 such as the above-described ASIC 340. Each of the bus controllers 24 connects to the arbitrator 22 through the internal bus 25. Each of the bus controllers 24 relays a data signal and so on, when communication of the data signal and so on are performed between the external input/output device 3 and the internal bus 25. Furthermore, each of the bus controllers 24 performs conversion of the standard of the data signal, if necessary. Each of the bus controllers 24 performs relaying of the data signal and so on, and the conversion of the standard of the data signal, to control an input/output timing of the data signal and so on.

The memory controller 21 connects to the shared memory 11 and the arbitrator 22. The memory controller 21 control access to the shared memory 11 by the CPU 23 and the external input/output devices 3. In the memory sharing system 100, the shared memory 11 is shared by the CPU 23 and the external input/output devices 3. Each of the external input/output devices 3 includes a plurality of function circuits. Each of the external input/output devices 3 accesses the shared memory 11 through the corresponding bus controller 24, the internal bus 25, the arbitrator 22, and the memory controller 21. The CPU 23 connects to the arbitrator 22. The CPU 23 accesses the shared memory 11 through the arbitrator 22 and the memory controller 21.

The arbitrator 22 arbitrates access requests to the shared memory 11 from the CPU 23 and the external input/output devices 3 (function circuits 37 (FIG. 2) described later). In other words, the arbitrator 22 assigns a use right of the internal bus 25 to each of the external input/output devices 3, based on predetermined arbitration content. The setting of the arbitration content of the arbitrator 22 can be changed. The arbitration content includes a rule of priority order and so on of each of the external input/output devices 3, for example. The arbitration content includes a transfer interval at which each of the external input/output devices transfers a data signal and so on, for example. Furthermore, the arbitration content includes a data transfer time and so on by each of the external input/output devices 3. The data transfer time is a communication time required for transferring a data signal and so on between the external input/output device 3 and the shared memory 11. The data transfer time set as the arbitration content is a reference communication time which is determined so that the ability of the function circuits of each of the external input/output devices 3 is sufficiently exerted. The arbitrator 22 gives a prescribed data transfer time to each of the external input/output devices 3 at a definite transfer interval, in accordance with the rule of the predetermined priority order and so on. The arbitrator 22 gives the data transfer time, to assign the use right of the internal bus 25 to each of the external input/output devices 3.

Figure 2:
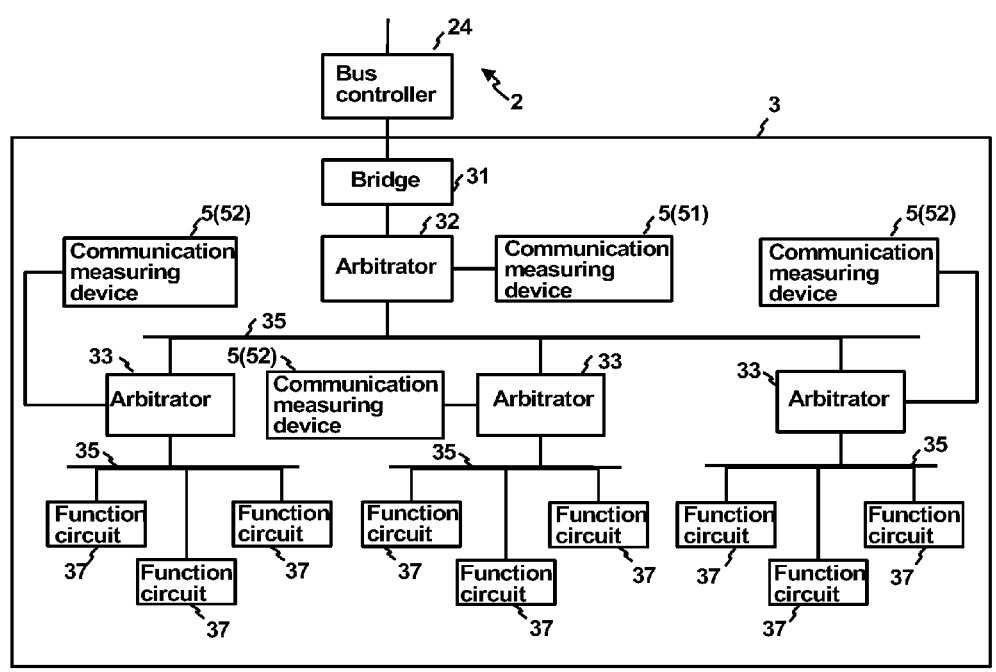
FIG. 2 is a block diagram showing an internal configuration of an external input/output device of the memory sharing system according to the first embodiment.

Hereinafter, an internal configuration of the external input/output device 3 such as the above-described ASIC 340 will be described with reference to FIG. 2. FIG. 2 is a block diagram showing an internal configuration of the external input/output device 3. The external input/output device 3 has a bridge 31, arbitrators 32, 33, communication measuring devices 5(51, 52), a plurality of function circuits 37, and an internal bus 35.

The bridge 31 connects to the bus controller 24 of the SOC 2. The arbitrator 32 connects to the bridge 31. The arbitrator 32 further connects to the arbitrators 33 through the internal bus 35. The arbitrators 33 include a plurality of arbitrators. Each of a plurality of the arbitrators 33 is provided for every function circuits 37 of a prescribed number. Specifically, each of the function circuits 37 connects to the corresponding arbitrator 33 through the internal bus 35 for every function circuits 37 of the prescribed number. Each of the function circuits 37 accesses the shared memory 11 through the arbitrators 32, 33, the bridge 31, the bus controller 24 and so on. When accessing the shared memory 11, each of the function circuits 37 transmits and receives a data signal and so on, while being arbitrated by the arbitrators 32, 33. Specifically, each of the function circuits 37 performs a prescribed calculation, and performs a write operation and a read operation of the data signal to the shared memory 11.

The internal bus 35 communicates an input/output signal of each of the function circuits 37. The internal bus 35 constitutes unified communication means in order that each of the function circuits 37 performs a write operation and a read operation. The arbitrators 32, 33, similarly as the arbitrator 22 of the SOC 2, assign a use right of the internal bus 35 to each of the function circuits 37, based on the predetermined arbitration content. In each of the arbitrators 22, 32, 33, the above-described arbitration content is previously set, which includes the rule of the predetermined priority order and so on of the function circuit 37 that is made to use the internal buses 25, 35. Each of the arbitrators 32, 33 connects to the communication measuring devices 5(51, 52).

The external input/output device 3 has a tree structure in which a plurality of the arbitrators 33 of a lower rank connect to the arbitrator 32 of a higher rank, and a plurality of the function circuits 37 of the prescribed number connect to each of the arbitrators 33 of the lower rank. The communication measuring device 5 measures an actual communication time for transferring the data signal and so on by each of the function circuits 37. The communication measuring device 5 determines whether or not this measured communication time is not less than the reference communication time set for each of the function circuits 37 as the arbitration content. The communication measuring device 5 stores this determination result, as the determination result of the arbitration content, in a storage device 512 (FIG. 4) accessible from the outside.

With the above-described configuration, the memory sharing system 100 (the CPU 23) refers to the determination result of the arbitration content stored in the determination result storage device 512. With reference to the determination result, the memory sharing system 100 can grasp whether or not the measured communication time of each of the function circuits 37 is within a range of the reference communication time corresponding to each of the function circuits 37. Accordingly, the memory sharing system 100 can confirm whether or not the arbitration content of the arbitrator 32 is set so that the ability of each of the function circuits 37 is sufficiently exerted. When the measured communication time of the function circuit 37 is without the range of the above-described reference communication time, in other words, when the arbitration content of the arbitrator 32 is set so that the ability of the function circuit 37 is not sufficiently exerted, it is only necessary to set the arbitration content of the arbitrator 32 again.

Figure 3:
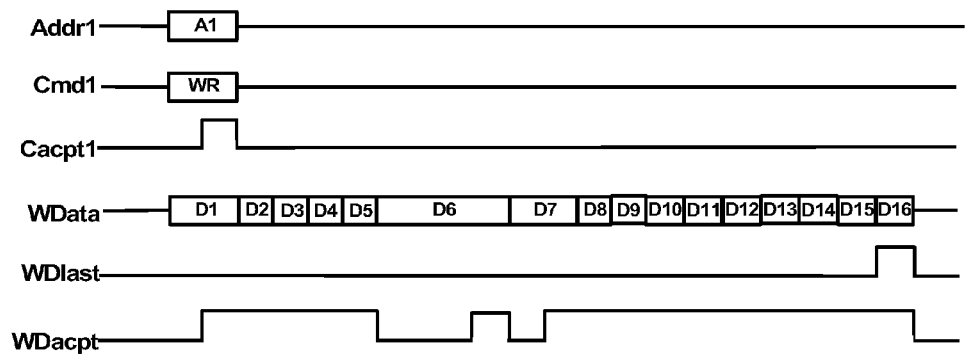
FIG. 3 is a timing chart of signals each of which is inputted to and/or outputted from an arbitrator, during a write operation to a shared memory of the memory sharing system according to the first embodiment.

Hereinafter, each signal which is inputted to and/or outputted from the arbitrator 33 during a write operation of the function circuit 37 to the shared memory 11 will be described with reference to FIG. 3. FIG. 3 is a timing chart of signals each of which is inputted to and/or outputted from the arbitrator 33 during the write operation of the function circuit 37 to the shared memory 11. Addr1 is a signal outputted from the function circuit 37. The signal Addr1 is an address signal showing an address of the shared memory 11 to which the function circuit 37 wants to write. A command signal Cmd is a signal showing whether an access request from the function circuit 37 is a write operation or a read operation. Cmd is a command signal outputted from the function circuit 37. Cmd1 is a command signal showing that the access request from the function circuit 37 is the write operation, in the above-described command signal Cmd. Cacpt1 is a signal outputted from the memory controller 21. The signal Cacpt1 is a command acceptance signal to notify that the memory controller 21 has accepted the address signal Addr1 and the command signal Cmd1. WData is a signal outputted from the function circuit 37. The signal WData is a write data signal of the content which the function circuit 37 wants to write in the shared memory 11. WDlast is a signal outputted from the function circuit 37. The signal WDlast is a last write data notification signal to notify the last of the write data signal WData. WDacpt is a signal outputted from the memory controller 21. The signal WDacpt is a write data acceptance signal to notify that the memory controller 21 has accepted the write data signal WData. Using the above-described address signal Addr1, the command signal Cmd1, the command acceptance signal Cacpt1, the write data signal WData, the last write data notification signal WDlast, and the write data acceptance signal WDacpt, the communication measuring device 5 described later measures an actual communication time of the write operation of the function circuit 37.

Figure 4:
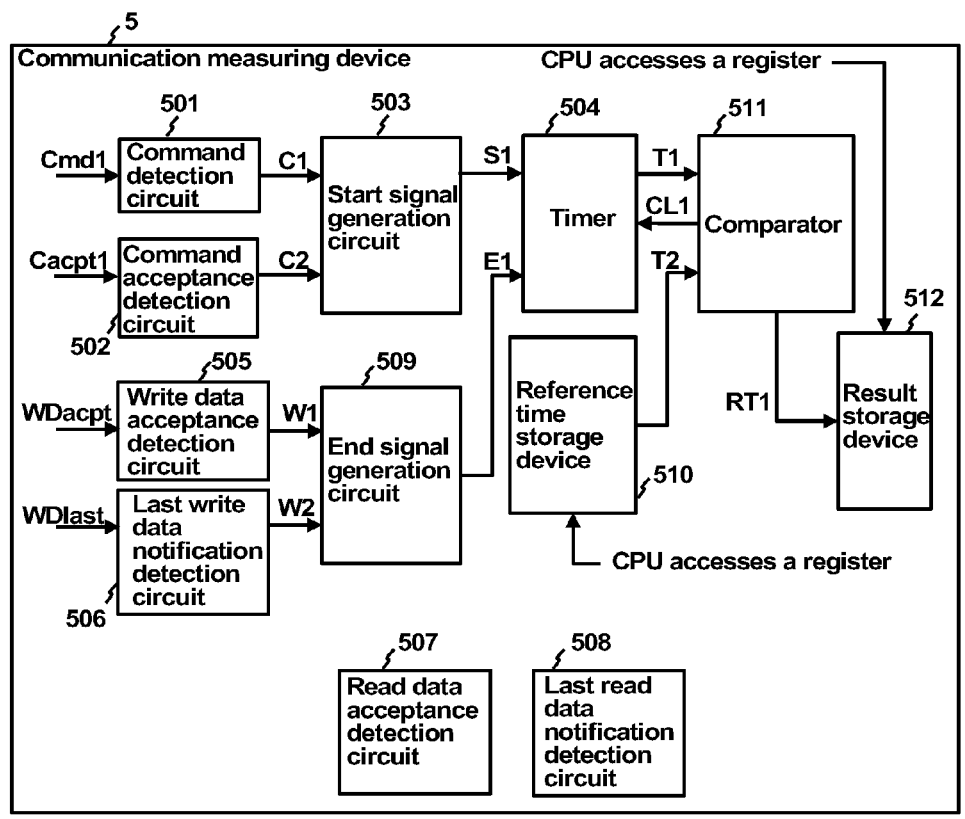
FIG. 4 is a block diagram showing a configuration of a communication measuring device during the write operation of the memory sharing system according to the first embodiment.
Figure 6:
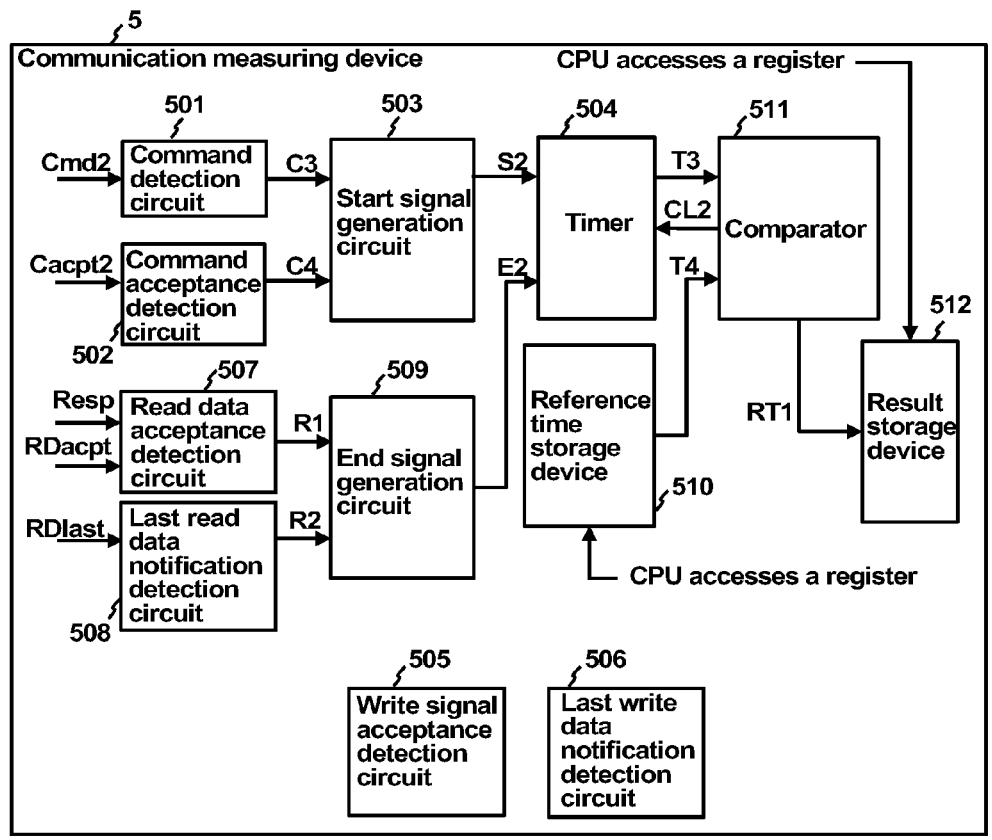
FIG. 6 is a block diagram showing a configuration of the communication measuring device during the read operation of the memory sharing system according to the first embodiment.

Hereinafter, an internal configuration of the communication measuring device 5 will be described with reference to FIG. 4 and FIG. 6. FIG. 4 is a block diagram showing a configuration of the communication measuring device 5 during the write operation by the function circuit 37. FIG. 6 is a block diagram showing a configuration of the communication measuring device 5 during the read operation by the function circuit 37. As shown in FIG. 4 and FIG. 6, the communication measuring device 5 has a command detection circuit 501, a command acceptance detection circuit 502, a start signal generation circuit 503, a timer 504, a write data acceptance detection circuit 505, a last write data notification detection circuit 506, a read data acceptance detection circuit 507, a last read data notification detection circuit 508, an end signal generation circuit 509, a reference time storage device 510, a comparator 511, and a result storage device 512.

Hereinafter, operations of the respective configurations of the communication measuring device 5 during the write operation by the function circuit 37 will be described with reference to FIG. 4. In addition, the read data acceptance detection circuit 507, and the last read data notification detection circuit 508 will separately be described later.

The command detection circuit 501 detects the command signal Cmd1 outputted from the function circuit 37. The command signal Cmd1 is the command signal showing that the access request of the function circuit 37 is the write operation. Upon detecting the command signal Cmd1, the command detection circuit 501 outputs a detection signal C1. The command acceptance detection circuit 502 detects the command acceptance signal Cacpt1 outputted from the memory controller 21. The command acceptance signal Cacpt1 is the acceptance signal for notifying that the memory controller 21 has accepted the command signal Cmd1. Upon detecting the command acceptance signal Cacpt1, the command acceptance detection circuit 502 outputs a detection signal C2.

The start signal generation circuit 503 generates a start signal S1 based on the detection signal C1, and the detection signal C2. The start signal S1 is a signal for starting the operation of the timer 504 so as to measure a communication time of the write operation. The write data acceptance detection circuit 505 detects the write data acceptance signal WDacpt outputted from the memory controller 21. The write data acceptance signal WDacpt is the acceptance signal for notifying that the memory controller 21 has accepted the write data signal WData. Upon detecting the write data acceptance signal WDacpt, the write data acceptance detection circuit 505 outputs a detection signal W1.

The last write data notification detection circuit 506 detects the last write data notification signal WDlast outputted from the function circuit 37. The last write data notification signal WDlast is the last notification signal for the function circuit 37 to notify the last of the write data signal WData. Upon detecting the last write data notification signal WDlast, the last write data notification detection circuit 506 outputs a detection signal W2. The end signal generation circuit 509 generates a stop signal E1, based on the detection signal W1, and the detection signal W2. The stop signal E1 is a signal for stopping the operation of the timer 504.

The timer 504 starts the measurement of a communication time during the write operation by the function circuit 37, by the start signal S1 outputted from the start signal generation circuit 503. The timer 504 stops the measurement of the communication time during the above-described write operation, by the stop signal E1 outputted from the end signal generation circuit 509. The timer 504 outputs a measurement value T1 when the measurement is stopped, as the communication time during the write operation of the function circuit 37. The reference time storage device 510 is a register accessible from the outside (the CPU 23). The reference time storage device 510 stores a reference communication time T2, as the arbitration content of the arbitrator 32, by the access from the CPU 23, for example. The reference communication time T2 is a time which becomes a reference for the communication time during the write operation for each of the function circuits 37. The reference communication time T2 is determined so that the ability of the function circuit 37 during the write operation is sufficiently exerted.

The comparator 511 compares the above-described measurement value T1 of the communication time during the write operation of the function circuit 37, with the above-described reference communication time T2. The comparator 511 determines whether or not the measurement value T1 is within the range of the reference communication time T2, based on this comparison result. The comparator 511 stores this determination result RT1 in the determination result storage device 512. Furthermore, when the above-described comparison is finished, the comparator 511 outputs a signal CL1 to the timer 504. The signal CL1 is a signal to clear the measurement value of the timer 504.

The determination result storage device 512 is a register accessible from the outside (the CPU 23), as described above. The determination result storage device 512 stores the determination result RT1 as to whether or not the measurement value T1 is within the range of the reference communication time T2. The CPU 23 reads out the determination result RT1 stored in the determination result storage device 512, to confirm the determination result RT1. As a result that the CPU 23 has confirmed the determination result RT1, when the measurement value T1 is within the range of the reference communication time T2, the CPU 23 recognizes that the write operation of the function circuit 37 has been completed within an estimated time. As a result that the CPU 23 has confirmed the determination result RT1, when the measurement value T1 is outside the range of the reference communication time T2, the CPU 23 recognizes that the write operation of the function circuit 37 has not been completed within the estimated time.

Figure 5:
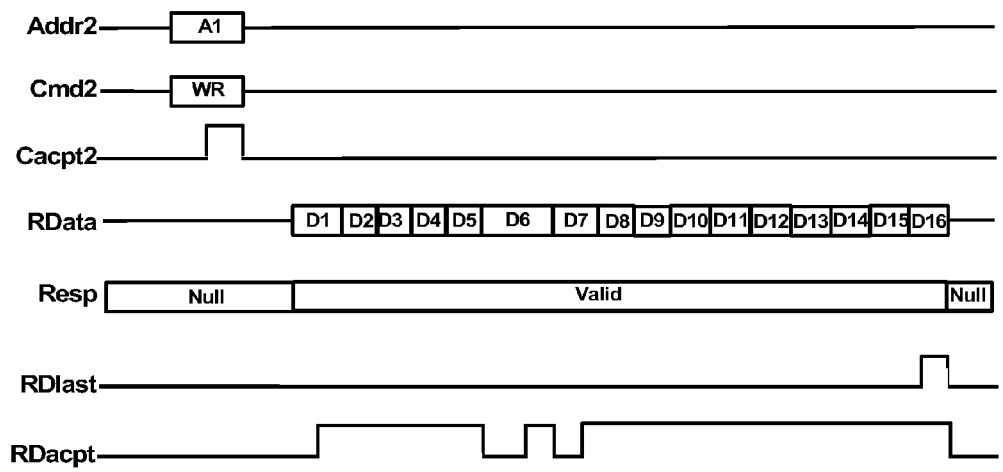
FIG. 5 is a timing chart of signals each of which is inputted to and/or outputted from the arbitrator during a read operation to the shared memory of the memory sharing system according to the first embodiment.

Hereinafter, each signal which is inputted to and/or outputted from the arbitrator 33 during a read operation of the function circuit 37 to the shared memory 11 will be described with reference to FIG. 5. FIG. 5 is a timing chart of signals each of which is inputted to and/or outputted from the arbitrator 33 during the read operation of the function circuit 37 to the shared memory 11.

Addr2 is a signal outputted from the function circuit 37. The signal Addr2 is an address signal showing an address of the shared memory 11 from which the function circuit 37 wants to read. Cmd2 is a signal outputted from the function circuit 37. The signal Cmd2 is a command signal showing that the request from the function circuit 37 is the read operation, in the above-described command signal Cmd. Cacpt2 is a signal outputted from the memory controller 21. The signal Cacpt2 is a command acceptance signal to notify that the memory controller 21 has accepted the address signal Addr2 and the command signal Cmd2. RData is a signal outputted from the memory controller 21. The signal RData is a read data signal which the memory controller 21 has read out from the shared memory 11. Resp is a signal outputted from the memory controller 21. The signal Resp is an enable/disable notification signal to notify that the read data signal RData is in an enable state or in a disable state. RDlast is a signal outputted from the memory controller 21. The signal RDlast is a last read data notification signal to notify the last of the read data signal RData. RDacpt is a signal outputted from the function circuit 37. The signal RDacpt is a read data acceptance signal to notify that the function circuit 37 has accepted the read data signal RData. Using the above-described address signal Addr2, the command signal Cmd2, the command acceptance signal Cacpt2, the read data signal RData, the last read data notification signal RDlast, and the read data acceptance signal RDacpt, the communication measuring device 5 measures an actual communication time of the read operation of the function circuit 37.

Hereinafter, operations of the respective configurations of the communication measuring device 5 during the read operation by the function circuit 37 will be described with reference to FIG. 6. FIG. 6 is a block diagram showing the communication measuring device 5 during the read operation by the function circuit 37, as described above. As shown in FIG. 6, the command detection circuit 501 detects the command signal Cmd2 outputted from the function circuit 37. The command signal Cmd2 is the command signal showing that the request from the function circuit 37 is the read operation, in the above-described command signal Cmd. Upon detecting the command signal Cmd2, the command detection circuit 501 outputs a detection signal C3. The command acceptance detection circuit 502 detects the command acceptance signal Cacpt2 outputted from the memory controller 21. The command acceptance signal Cacpt2 is the acceptance signal for notifying that the memory controller 21 has accepted the command signal Cmd2. Upon detecting the command acceptance signal Cacpt2, the command acceptance detection circuit 502 outputs a detection signal C4.

The start signal generation circuit 503 generates a start signal S2, based on the detection signal C3, and the detection signal C4. The start signal S2 is a signal for starting the operation of the timer 504 In order to measure a communication time of the read operation. The read data acceptance detection circuit 507 detects the enable/disable notification signal Resp outputted from the memory controller 21. The enable/disable notification signal Resp is the notification signal for the memory controller 21 to notify whether the read data signal RData is in an enable state or in a disable state. Furthermore, the read data acceptance detection circuit 507 detects the read data acceptance signal RDacpt outputted from the function circuit 37. The read data acceptance signal RDacpt is the acceptance signal for notifying that the function circuit 37 has accepted the read data signal RData. Upon detecting the enable/disable notification signal Resp and the read data acceptance signal RDacpt, the read data acceptance detection circuit 507 outputs a detection signal R1.

The last read data notification detection circuit 508 detects the last read data notification signal RDlast outputted from the memory controller 21. The last read data notification signal RDlast is the last notification signal for the memory controller 21 to notify the last of the read data signal RData. Upon detecting the last read data notification signal RDlast, the last read data notification detection circuit 508 outputs a detection signal R2. The end signal generation circuit 509 generates a stop signal E2, based on the detection signal R1, and the detection signal R2. The stop signal E2 is a stop signal for stopping the operation of the timer 504.

The timer 504 starts the measurement of a communication time, by the start signal S2 outputted from the start signal generation circuit 503. The communication time is a time during which the function circuit 37 performs the read operation to the shared memory 11. The timer 504 stops the measurement of the communication time, by the stop signal E2 outputted from the end signal generation circuit 509. The timer 504 outputs a measurement value T3 when the measurement is stopped, as the communication time during the read operation of the function circuit 37. The reference time storage device 510 stores a reference communication time T4 by the access from the CPU 23, as the arbitration content of the arbitrator 32. The reference communication time T4 is a time which becomes a reference for the communication time during the read operation for each of the function circuits 37. The reference communication time T4 is determined so that the ability of the function circuit 37 during the read operation is sufficiently exerted.

The comparator 511 compares the above-described measurement value T3 of the communication time during the read operation of the function circuit 37, with the above-described reference communication time T4. The comparator 511 determines whether or not the measurement value T3 is within the range of the reference communication time T4 based on this comparison result. The comparator 511 stores this determination result RT2 in the determination result storage device 512. Furthermore, when the above-described comparison is finished, the comparator 511 outputs a signal CL2 to the timer 504. The signal CL2 is a signal to clear the measurement value of the timer 504.

The determination result storage device 512 stores the determination result RT2 as to whether or not the measurement value T3 is within the range of the reference communication time T4. The CPU 23 reads out the determination result RT2 stored in the determination result storage device 512, to confirm the determination result RT2. As a result that the CPU 23 has confirmed the determination result RT2, when the measurement value T3 is within the range of the reference communication time T4, the CPU 23 recognizes that the read operation of the function circuit 37 has been completed within an estimated time. As a result that the CPU 23 has confirmed the determination result RT2, when the measurement value T3 is outside the range of the reference communication time T4, the CPU 23 recognizes that the read operation of the function circuit 37 has not been completed within the estimated time.

Figure 7:
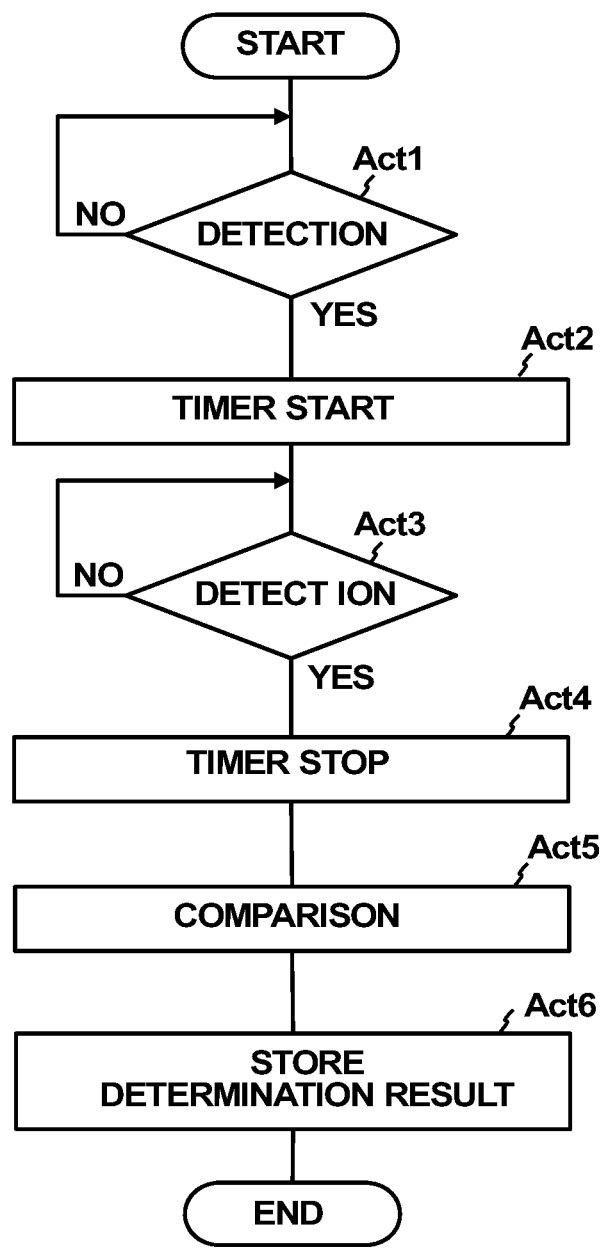
FIG. 7 is a flow chart showing a storage processing of determination result by the communication measuring device of the memory sharing system according to the first embodiment.

Hereinafter, a processing which the communication measuring device 5 stores the determination result of the arbitration content set in the arbitrator 32 in the determination result storage device 512 will be described with reference to FIG. 7. FIG. 7 is a flow chart showing a storage processing of the determination result by the communication measuring device 5. In an Act1, the communication measuring device 5 waits that the command detection circuit 501 detects the command signal Cmd1, or the command Cmd2 outputted from the function circuit 37. The command signal Cmd1 is the command signal showing that the request of the function circuit 37 to shared memory 11 is the write operation. The command Cmd2 is the command signal 37 showing that the request of the function circuit 37 to shared memory 11 is the read operation. Furthermore, in the Act1, the communication measuring device 5 waits that the command detection circuit 502 detects the command acceptance signal Cacpt1, or the command acceptance signal Cacpt2 outputted from the memory controller 21. The command acceptance signal Cacpt1 is the acceptance signal for notifying that the memory controller 21 has accepted the command signal Cmd1. The command acceptance signal Cacpt2 is the acceptance signal for notifying that the memory controller 21 has accepted the command signal Cmd2. When the command detection circuit 501 detects the command signal Cmd1, and the command detection circuit 502 detects the command acceptance signal Cacpt1 (when the request of the function circuit 37 is the write operation), the processing of the communication measuring device 5 proceeds to an Act2. Furthermore, when the command detection circuit 501 detects the command signal Cmd2, and the command detection circuit 502 detects the command acceptance signal Cacpt2 (when the request of the function circuit 37 is the read operation), the processing of the communication measuring device 5 proceeds also to the Act2. When the request of the function circuit 37 is the write operation, in the Act2, the communication measuring device 5 makes the timer 504 to be started, in order to measure the communication time of the write operation. Specifically, the command detection circuit 501 outputs the detection signal C1. Furthermore, the command acceptance detection circuit 502 outputs the detection signal C2. The start signal generation circuit 503 generates the start signal S1 of the timer 504, based on the detection signal C1 outputted from the command detection circuit 501, and the detection signal C2 outputted from the command acceptance detection circuit 502. The timer 504 starts measurement of the communication time for the write operation by the function circuit 37, by the start signal S1 outputted from the start signal generation circuit 503. On the other hand, when the request of the function circuit 37 is the read operation, in the Act2, the communication measuring device 5 makes the timer 504 to be started, in order to measure the communication time of the read operation. Specifically, the command detection circuit 501 outputs the detection signal C3. Furthermore, the command acceptance detection circuit 502 outputs the detection signal C4. The start signal generation circuit 503 generates the start signal S2 of the timer 504, based on the detection signal C3 outputted from the command detection circuit 501, and the detection signal C4 outputted from the command acceptance detection circuit 502. The timer 504 starts measurement of the communication time for the read operation by the function circuit 37, by the start signal S2 outputted from the start signal generation circuit 503.

After the timer 504 is started, the processing of the communication measuring device 5 proceeds to an Act3. In the Act3, when the request of the function circuit 37 is the write operation, the communication measuring device 5 waits that the write data acceptance detection circuit 505 detects the write data acceptance signal WDacpt from the memory controller 21. The write data acceptance signal WDacpt is the acceptance signal to notify that the memory controller 21 has accepted the write data signal WData. Furthermore, the communication measuring device 5 waits that the final write data notification detection circuit 506 detects the last write data notification signal WDlast from the function circuit 37. The last write data notification signal WDlast is the notification signal for the function circuit 37 to notify the last of the write data signal WData. When the write data acceptance detection circuit 505 detects the write data acceptance signal WDacpt, and the last write data notification detection circuit 506 detects the last write data notification signal WDlast (Yes in the Act3), the processing of the communication measuring device 5 proceeds to an Act4. In the above-described Act3, when the request of the function circuit 37 is the read operation, the communication measuring device 5 waits that the read data acceptance detection circuit 507 detects the enable/disable notification signal Resp from the memory controller 21. The enable/disable notification signal Resp is the notification signal for the memory controller 21 to notify the enable state or the disable state of the read data signal RData. Furthermore, the communication measuring device 5 waits that the read data acceptance detection circuit 507 detects the read data acceptance signal RDacpt from the function circuit 37. The read data acceptance signal RDacpt is the acceptance signal to notify that the function circuit 37 has accepted the read data signal RData. Furthermore, the communication measuring device 5 waits that the last read data notification detection circuit 508 detects the last read data notification signal RDlast from the memory controller 21. The last read data notification signal RDlast is the notification signal for the memory controller 21 to notify the last of the read data signal RData. When the read data acceptance detection circuit 507 detects the enable/disable notification signal Resp and the read data acceptance signal RDacpt, and the last read data notification detection circuit 508 detects the last read data acceptance signal RDlast (Yes in the Act3), the processing of the communication measuring device 5 proceeds to the Act4. In the Act4, the communication measuring device 5 stops the measurement of the communication time by the timer 504. Specifically, when the request of the function circuit 37 is the write operation, the write data acceptance detection circuit 505 outputs the detection signal W1. Furthermore, the last write data notification detection circuit 506 outputs the detection signal W2. The end signal generation circuit 509 generates the stop signal E1 of the timer 504, based on the detection signal W1 outputted from the write data acceptance detection circuit 505 and the detection signal W2 outputted from the last write data notification detection circuit 506. On the other hand, in the above-described Act4, when the request of the function circuit 37 is the read operation, the read data acceptance detection circuit 507 output the detection signal R1. Furthermore, the last read data notification detection circuit 508 outputs the detection signal R2. The end signal generation circuit 509 generates the stop signal E2 of the timer 504, based on the detection signal R1 outputted from the read data acceptance detection circuit 507 and the detection signal R2 outputted from the last read data notification detection circuit 508. The timer 504 stops the measurement of the communication time, by the stop signal E1 or E2 outputted from the end signal generation circuit 509. The communication measuring device 5 acquires the measurement value T1 of the timer 504 when the measurement is stopped, as the communication time during the write operation of the function circuit 37. The communication measuring device 5 acquires the measurement value T3 of the timer 504 when the measurement is stopped, as the communication time during the read operation of the function circuit 37.

After the timer 504 stops the measurement, the processing of the communication measuring device 5 proceeds to an Act5. In the Act5, the communication measuring device 5 determines whether or not the measurement values T1, T3 of the communication time are respectively within the range of the above-described reference communication times T2, T4 set for each of the function circuits 37. Specifically, the comparator 511 compares the measurement values T1, T3 by the timer 504, with the respective reference communication times T2, T4 stored in the reference time storage device 510. The comparator 511 determines whether or not the measurement values T1, T3 of the communication time are within the range of the reference communication times T2, T4, respectively. After the comparison by the comparator 511 is finished, the processing of the communication measuring device 5 proceeds to an Act6. In the Act6, the comparator 511 stores the above-described determination result RT1 in the determination result storage device 512 which is accessible from the outside (the CPU 23), as the determination result during the write operation of the function circuit 37. The comparator 511 stores the above-described determination result RT2 in the determination result storage device 512 which is accessible from the outside (the CPU 23), as the determination result during the read operation of the function circuit 37. With the above-described processings, the storage processing of the determination result by the communication measuring device 5 is finished.

The CPU 23 reads out the determination results RT1, RT2 from the determination result storage device 512, and thereby can confirm the determination results RT1, RT2. As a result that the CPU 23 has confirmed the determination results RT1, RT2, when the measurement values T1, T3 are respectively within the range of the reference communication times T2, T4, the CPU 23 recognizes that the write operation or the read operation has been completed within the estimated time. In other words, the CPU 23 recognizes that the setting content of the arbitrator 32 is proper. Furthermore, as a result that the CPU 23 has confirmed the determination results RT1, RT2, when the measurement values T1, T3 are outside the range of the reference communication times T2, T4, respectively, the CPU recognizes that the write operation or the read operation has not been completed within the estimated time. In other words, the CPU 23 recognizes that the setting content of the arbitrator 32 is not proper.

As described above, according to the first embodiment, the shared memory using circuit has a plurality of the function circuits, the bus, the arbitrator, and the communication measuring device. Each of a plurality of the function circuits performs a prescribed calculation. The bus communicates an input/output signal of each of the function circuits. The arbitrator assigns the use right of the bus to each of the function circuits. The communication measuring device measures the communication time of each of the function circuits. The communication measuring device determines whether or not this measured communication time is within the range of the reference communication time set for each of the function circuits. The communication measuring device stores this determination result in the determination result storage device which is accessible from the outside. The shared memory using circuit may be the external input/output device 3, or may be the memory sharing system 100.

In the above-described embodiment, the order of the processings may be different from the order exemplified in the above described embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A circuit for using a shared memory comprising:
   a plurality of function circuits, each of which performs a prescribed calculation;
   a bus to communicate an input/output signal between the bus and each of the function circuits;
   a plurality of arbitrators to assign a use right of the bus to each of the function circuits based on predetermined arbitration content, the predetermined arbitration content including a reference communication time set for each of the function circuits; and
   a communication measuring device including a timer configured to measure a communication time, for each of the plurality of arbitrators, which is a time from a start of access to the shared memory to an end of the access to the shared memory, the communication measuring device configured to determine whether or not the measured communication time is within a range of the reference communication time, and store the determination result in a determination result storage device to determine whether or not the predetermined arbitration content is proper.

2. The circuit according to claim 1, wherein the communication measuring device comprises:
   a start signal generation circuit that generates a start signal of the timer, based on a command signal, which is outputted from the function circuit and indicates that the access request of the function circuit is a write operation to the shared memory, and an acceptance signal, which is outputted from a memory controller to control an access to the shared memory by the function circuit and notifies that the memory controller has accepted the command signal.

3. The circuit according to claim 2, wherein the communication measuring device, further comprises:
an end signal generation circuit which generates an end signal to make the timer finish measurement of the communication time, based on a notification signal which is outputted from the function circuit, and notifies last of a write data signal, and an acceptance signal which is outputted from the memory controller, and notifies that the write signal has been accepted.

4. The circuit according to claim 3, wherein the communication measuring device, further comprises:
a reference time storage device which is accessible from outside, and stores the reference communication time set for each of the function circuits, for the write operation by the function circuit.

5. The circuit according to claim 4, wherein the communication measuring device further comprises:
a comparator which compares the communication time, that the timer measures, during the write operation of the function circuit, with the reference communication time, determines whether the measured communication is within the range of the reference communication time, and stores the determination result in the determination result storage device.

6. The circuit according to claim 1, wherein the communication measuring device comprises:
a start signal generation circuit that generates a start signal of the timer, based on a command signal, which is outputted from the function circuit and indicates that the access request of the function circuit is a read operation to the shared memory, and an acceptance signal, which is outputted from a memory controller to control an access to the shared memory by the function circuit and notifies that the memory controller has accepted the command signal.

7. The circuit according to claim 6, wherein the communication measuring device further comprises:
an end signal generation circuit which generates an end signal to make the timer finish measurement of the communication time, based on a notification signal which is outputted from the memory controller, and notifies last of a read data signal, a notification signal which is outputted from the memory controller, and notifies whether the read data signal is in an enable state or a disable state, and an acceptance signal which is outputted from the function circuit, and notifies that the read signal has been accepted.

8. The circuit according to claim 7, wherein the communication measuring device, further comprises:
a reference time storage device which is accessible from outside, and stores the reference communication time set for each of the function circuits, for the read operation by the function circuit.

9. The circuit according to claim 8, wherein the communication measuring device further comprises:
a comparator which compares the communication time, that the timer measures, during the read operation of the function circuit, with the reference communication time, determines whether the measured communication time is within the range of the reference communication time, and stores the determination result in the determination result storage device.

10. The circuit according to claim 1, further comprising:
a plurality of the arbitrators, and a plurality of the communication measuring devices corresponding to the plurality of the arbitrators.

11. In a circuit to use a shared memory, having a plurality of function circuits each of which performs a prescribed calculation, a bus to communicate an input/output signal of each of the function circuits, and a plurality of arbitrators to assign a use right of the bus to each of the function circuits based on predetermined arbitration content, the predetermined arbitration content including a reference communication time set for each of the function circuits, a method of storing determination result of arbitration content of the plurality of arbitrators, comprising:
measuring, using a timer, a communication time, for each of the plurality of arbitrators, which is a time from a start of access to the shared memory to an end of the access to the shared memory;
determining whether or not the measured communication time is within a range of the reference communication time; and
storing the determination result in a determination result storage device to determine whether or not the predetermined arbitration content is proper.

* * * * *